United States Patent [19]
Circenis

[11] Patent Number: 6,026,424
[45] Date of Patent: Feb. 15, 2000

[54] METHOD AND APPARATUS FOR SWITCHING LONG DURATION TASKS FROM SYNCHRONOUS TO ASYNCHRONOUS EXECUTION AND FOR REPORTING TASK RESULTS

[75] Inventor: Edgar Circenis, Loveland, Colo.

[73] Assignee: Hewlett-Packard Company, Palo Alto, Calif.

[21] Appl. No.: 09/027,691

[22] Filed: Feb. 23, 1998

[51] Int. Cl.[7] ...................................................... G06F 9/00
[52] U.S. Cl. ............................................................ 709/104
[58] Field of Search .................................. 709/100, 102, 709/103, 104, 107

[56] References Cited

U.S. PATENT DOCUMENTS

| | | | |
|---|---|---|---|
| 4,635,187 | 1/1987 | Baron et al. | 709/100 |
| 5,544,318 | 8/1996 | Schmitz et al. | 709/207 |

*Primary Examiner*—Majid A. Banankhah

[57] ABSTRACT

A client process in a computer system opens a communication channel to a server process in the computer system and instructs the server process to execute a task. The server process starts a timer when it begins execution of the task, to determine whether the task is of short or long duration. If the task completes before the timer reaches a predetermined value, the server process reports task completion to the client process on the open communication channel. If the task does not complete before the timer reaches the predetermined value, the server process closes the communication channel to preserve system resources and continues executing the task asynchronously. When the task is complete, the server process reopens a communication channel and reports task completion to the client process. Results are transmitted directly to the client process only if they are smaller than a predetermined size, otherwise, they are stored in a cache to preserve system resources. The client can then request the results when it is ready to receive them.

19 Claims, 5 Drawing Sheets

METHOD AND APPARATUS FOR SWITCHING LONG DURATION TASKS FROM SYNCHRONOUS TO ASYNCHRONOUS EXECUTION AND FOR REPORTING TASK RESULTS

FIELD OF THE INVENTION

The present invention relates generally to the field of task execution on a computer or computer network, and more particularly, to a system and method for intelligently executing tasks of varying duration, with results of varying size, to avoid tying up system resources.

BACKGROUND OF THE INVENTION

Task execution is a well known operation in the art of computer programming. Tasks in modern operating systems such as UNIX® are executed within processes. In general, a process comprises a set of resources such as program code, variables, open files, sockets, and one or more threads (i.e, threads of control). A thread is an object created inside a process to keep track of a task's progress and status during execution.

Prior to executing a task, a client process generally receives task instructions via user input (e.g., a keyboard or disk), a computer program, or some other source. The client process then instructs one or more server processes to execute a task or tasks. In executing a task, processes must communicate with each other to 1) specify the task to be run and what data to use, and 2) receive results. Processes typically communicate with each other using sockets, which are communication objects with an address. Communication between sockets takes place over communication channels which are opened and closed as needed.

As used herein, the term "client process" refers to a process which requests execution of a task, and the term "server process" refers to a process which executes a task. Although client and server processes will typically exist on different computers, it is possible that client and server processes be launched within a single computer.

Computer systems are rapidly moving toward management of large numbers of computers from a single station. To do this, the managing station must be able to perform large numbers of identical tasks on thousands of remote computers. However, computers often lack enough resources to manage all of the computers executing tasks on their behalf. A typical solution is to execute a subset of the total number of tasks to be executed, and then execute the remaining tasks when any currently executing tasks have finished. Unfortunately, this solution results in undesirable delay.

Other situations wherein a computer initiates remote execution of a task also arise. For example, a computer with limited resources might request that a task be executed on a central computer with more extensive resources. Likewise, cases arise wherein a computer with limited resources needs to distribute task execution over several computers so that a large task can be completed more expeditiously.

When a user initiates a task in a network, a client process contacts a server process running on a remote server to execute the task. The client process and server process communicate with each other using communication managers, comprising a socket and associated program code to react to data as it is received. Thus, for a client process to execute tasks in a server process, the client process registers the task with its communication manager so that it will be expecting to receive the results of the task from the server process. The client process then opens a communication channel to the server process and instructs server process to execute the task. The server process creates a thread and executes the task in it, then reports results to the client process.

In the past, tasks have been executed either asynchronously, or most commonly, synchronously. Each form of task execution has its advantages and disadvantages. Synchronous tasks can tie up system resources more than asynchronous tasks if the task is a long one, but asynchronous tasks take longer to set up and execute.

To execute a task synchronously, the client process opens a communication channel to the server process and instructs it to execute the task as described above, waits while the task is being executed, then receives the results that the server process transmits. This has the disadvantage of tying up system resources while the task is executing. The communication channel remains open and may not be used for other tasks, sitting idle while a single task executes. When the task is complete the results are transmitted to the client process.

To execute a task asynchronously, the client process registers the task, opens a communication channel to the server process, sends the task request, then closes the communication channel. When the task completes in the server process, the server process reopens a communication channel to the client process and transmits the results.

Synchronous tasks require communication channels to remain open, but avoid the extra work of opening and closing communication channels when needed. Asynchronous tasks do not require communication channels to remain open, but require the extra work of opening and closing communication channels. Therefore, long tasks should be executed asynchronously to conserve system resources and to allow an increased number of tasks to be executed simultaneously, and short tasks should be executed synchronously to avoid the delay of setting up an asynchronous execution. However, determining which mode of task execution to use has been a difficult problem to solve.

Nonetheless, selecting the best execution method is becoming increasingly important as computer systems evolve toward management of very large numbers of computers by a single station, and the number of computers connected to networks increases. For example, executing even a simple task on hundreds of remote systems can take hundreds of times as long as the task itself if the managing station can only execute the task on a few remote computers at one time. Similarly, if all tasks are executed asynchronously to increase the number of remote computers managed simultaneously, the delay in opening and closing communication channels repeatedly for the hundreds of brief tasks involved in computer management becomes a large burden. Selecting synchronous or asynchronous task execution properly becomes increasingly more important as the number of remote systems increases.

Unfortunately, it is very difficult to determine how long most tasks will last, making it difficult to create a system which executes tasks differently based on premeasured execution durations. For example, a task may last a long time in one instance and a short time in others if execution time depends on the amount or the nature of the data it processes, or if it performs a first-use initialization. Task duration is also dependent on speed of the computer system and efficiency of the operating system. System loading also slows down task execution during busy periods. Furthermore, even if task duration was consistent, measuring and keeping track of task duration during development and programming of tasks would be difficult and tedious at best, and would have to be updated when the computer hardware or operating system changed.

Another burden on system resources imposed by task execution is the reporting of results. As soon as the task is completed in the server process, the results are transmitted back to the client process. This unmanaged use of system resources leaves the client process waiting idly at times, and overburdened at others.

It would be desirable to provide a method and apparatus for executing tasks in remote processes synchronously or asynchronously based on task duration without any prior knowledge about the task and to return the results without flooding the requesting process during busy periods. The present invention achieves all of these goals.

SUMMARY

A system and method are provided for intelligently executing a task either synchronously or asynchronously depending on task duration determined during execution, increasing overall speed and reducing required system resources. Results are stored in a cache and are provided upon request by the client process which initiated the task, to avoid flooding the client process with data when it is busy.

A system for executing tasks having features of the present invention comprises a client process which initiates a task and a server process which executes the task. The client process opens a communication channel to the server process and instructs the server process to execute the task synchronously. The server process then starts a timer and executes the task. If the task completes before the timer reaches a predetermined value, the server process generates results of the task and reports task completion to the client process via the communication channel which remained open. If the task does not complete before the timer reaches a predetermined value, the server process notifies the client process that the task will be executed asynchronously and closes the communication channel. When an asynchronous task has completed, the server process generates results, opens a new communication channel to the client process and reports task completion to the client process via the new communication channel.

Results may be intelligently reported by the server process to avoid flooding the client process when it is busy. When the task has completed execution, the server process stores the results of the task in a cache. The server process then determines whether the size of the results exceeds a predetermined value. If the size of the results does not exceed the predetermined value, the server process transmits the results to the client process. If the size of the results exceeds the predetermined value, the server process indicates to the client process that results are available, and the client process can obtain the results from the cache when it is ready.

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawings, in which.

DESCRIPTION OF THE PREFERRED EMBODIMENT

Figure 1:
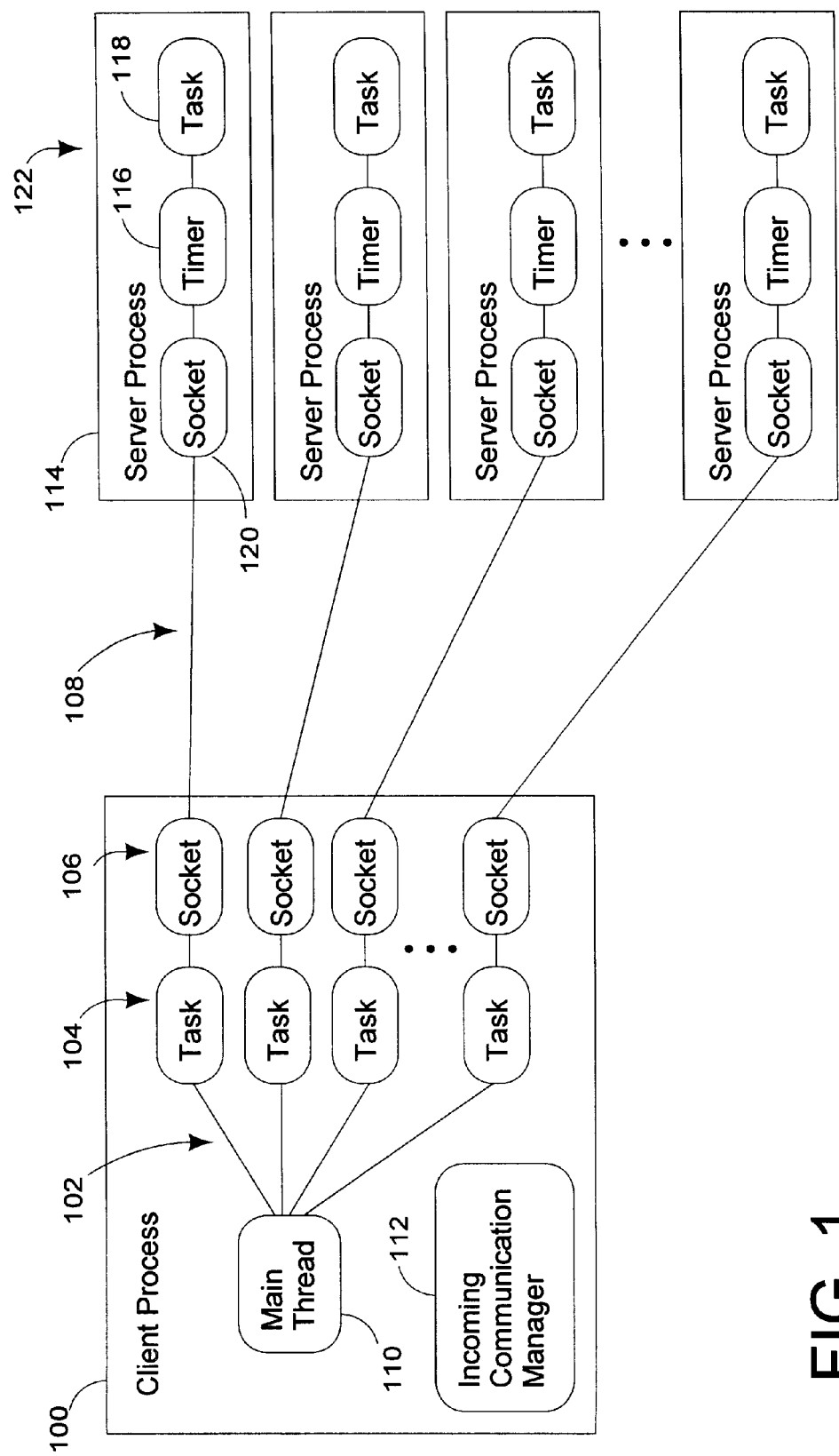
FIG. 1 is a block diagram illustrating resource usage as a number of remote tasks are initiated.

The method and apparatus disclosed herein provide for intelligent execution of remote tasks. The method and apparatus may be confined to a single computer, or alternatively, may be distributed across several computers forming a network computer system.

For purposes of this description, it is assumed that a client process has already been instructed to execute a task. A client process may be instructed to execute a task in a number of known ways (e.g., from a user inputting commands on a keyboard, or from a sequence of commands comprising a computer program), and further discussion of these ways is beyond the scope of this description.

By way of example, the client process discussed in this description is the computer of a network administrator. Since the client process requires execution of large numbers of identical tasks, but does not have enough resources to execute all of these tasks "locally" (i.e., in the computer of the network administrator), it requests that a number of server processes (i.e., additional computers connected to the network) execute the tasks "remotely". Although this configuration of client and server processes will be referred to by way of example in this description, it is important to note that in relation to the invention, a client process need only request execution of a task, and a server process need only initiate execution of a task. It is therefore envisioned that a client process and server process even be the same process.

As previously discussed, a server process executes tasks intelligently. Intelligent execution of remote tasks can involve two determinations: 1) whether to complete a task synchronously or asynchronously, and 2) whether to automatically return results to a client process upon task completion, or to merely notify a client process of task completion.

Short duration tasks are executed synchronously to minimize time required to initialize the execution process. Long duration tasks begin synchronously and are switched to asynchronous mode after they exceed a predetermined time limit. The time limit may be set by a user, or fixed in program code. By intelligently switching task execution to asynchronous mode, long duration tasks do not keep system resources waiting idly for the task to complete. For example, a typical network server can only support about 200 simultaneous threads. If a network administrator needs to initialize media such as a disk drive on each of 300 remote systems, the network administrator will not have enough available threads to synchronously control all of the remote systems, and must therefore execute some of the initialization tasks in a serial fashion. If it takes an hour for each media initialization, some initializations will not be completed for two hours (since at least 100 initializations cannot commence until the first 200 initializations are completed). One can appreciate that serial execution is undesirably slow, and that the problem is compounded as the number of tasks to be completed is increased. However, by beginning tasks in synchronous mode, and then switching them to asynchronous mode as they surpass a predetermined time limit, resources which are not essential to completion of a task can be freed and put to more efficient use. Unlike past systems, this can be done without any prior knowledge about the duration of a task. Asynchronous execution of longer tasks frees up all of the threads, sockets and communication channels opened by a client process. In the above example, the client process could begin initialization of the media in all 300 remote systems substantially simultaneously.

Intelligent execution of remote tasks, as envisioned by the inventor, also prevents unwanted saturation of a client process'resources when large amounts of data are generated in response to completion of remote tasks. This is accomplished by storing large result sets in remote caches (most likely caches in the remote servers), notifying a client process that results are available, and then allowing a client process to determine when to request the results. When a remote task has completed in a server process, the server process compares the size of the results to a predetermined size limit. If the results are larger than the limit, the server process stores the results and notifies the client process that they are available. The client process can then determine when to request them based on criteria such as network traffic and the priority of the task.

Having described the invention in general, a more detailed description of the invention follows.

A network computer system is illustrated in FIG. 1 to show the resources used in executing remote synchronous tasks. A client process 100 contains a main thread 110 which controls the remote execution of the task in all remote server processes 122. The main thread 110 spawns another thread 104, using memory resources 102, for each of the server processes 122 which are to execute the task. Each thread 104 acts as a state machine, keeping track of the progress of the task in its associated server process 122. Each thread 104 requires socket resources 106 and network resources 108 to communicate with the server processes 122. Client process 100 also contains an incoming communication manager 112 which keeps track of all server processes 122 which communicate with client process 100.

Each server process 114 contains its own socket 120, a task thread 118 and a timer 116.

FIGS. 2A–2D are a series of block diagrams illustrating the steps taken by client process 200 and server process 202 during synchronous execution of a task on a single remote server process 202.

Figure 2A:
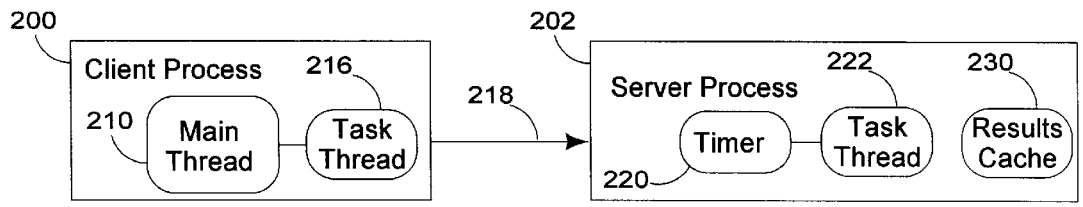
FIGS. 2A–2D are block diagrams illustrating resource usage during various steps of synchronous task execution.

In the first step, shown in FIG. 2A, the task is set up and both the task and timer 220 are executing. To set up the task, the main thread 210 of client process 200 spawns a thread 216 to execute the task on remote server process 202. Main thread 210 registers the task in client process 200 so that the incoming communication manager 112 of client process 200 will be expecting communication from server process 202. The general function and purpose of communication managers is known in the art. The presence of a processes'communication manager is therefore illustrated in FIG. 1, and implied in each of FIGS. 2A–2D and 3A–3D. Client process 200 opens a communication channel 218 to server process 202 and instructs it to execute the task. Server process 202 spawns a thread 222 to execute the task and starts a timer 220 to monitor the duration of the task. If timer 220 reaches a predetermined value before the task completes, the task will be completed in asynchronous mode, to be discussed below with respect to FIG. 3.

Figure 2B:
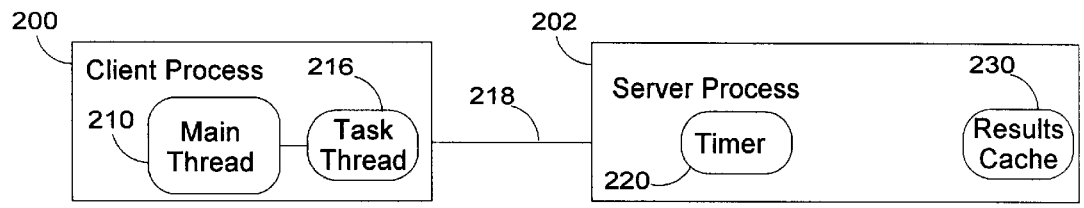

In the second step, shown in FIG. 2B, the task completes and interrupts timer 220. Communication channel 218 remained open from the first step shown in FIG. 2A. Server process 202 removes thread 222, freeing memory.

Figure 2C:
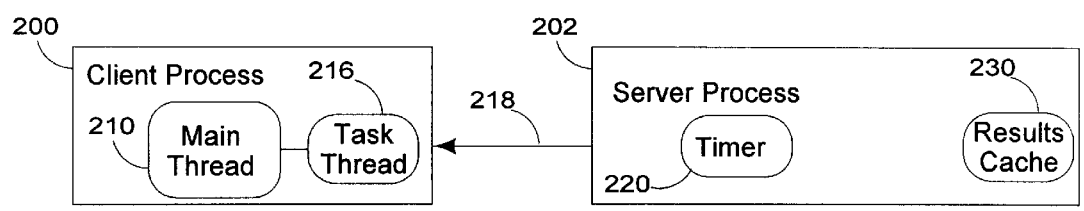

In the third step, shown in FIG. 2C, server process 202 reports the task status to thread 216 in client process 200 across communication channel 218 which remained open during the synchronous task execution.

Task status reported by server process 202 to client process 200 comprises either the task results, or alternatively, just a message (or notification) that results are ready. When the task is completed, results are stored in memory cache 230. If the task results are not greater than a predetermined size, server process 202 sends the task results to client process 200 immediately. If the task results are greater than a predetermined size, server process 202 sends a message to client process 200 that the task is complete and that client process 200 can request the results when it is ready. This prevents client process 200 from being overloaded with task results when it may be busy with another server process or another operation.

Figure 2D:
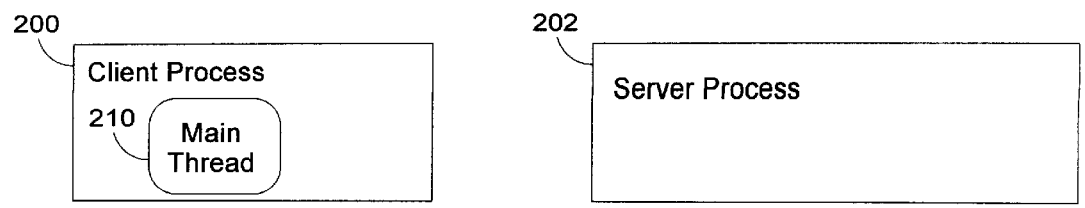

In the fourth step, shown in FIG. 2D, the task is complete and client process 200 and server process 202 free the system resources used in executing the task.

If communication channel 218 shown in FIGS. 2A–2C is inadvertently disrupted during the task, it is reopened according to known methods. Since the task was registered with client process 200, the incoming communication manager 112 shown in FIG. 1 will accept communication across a reopened communication channel without interfering with the task execution.

FIGS. 3A–3E are a series of block diagrams illustrating the steps taken by client process 300 during asynchronous execution of a task on a single remote server process 302.

Again, a task begins in synchronous mode and then switches to asynchronous mode when it is identified as a long duration task. In the first step, shown in FIG. 3A, the task is set up and begun in synchronous mode as discussed above. To set up the task, the main thread 304 of client process 300 spawns a thread 316 to execute the task on remote server process 302. Main thread 304 registers the task in client process 300 so that incoming communication manager 112, shown in FIG. 1, will be expecting communication from server process 302. Thread 316 opens a communication channel 318 to server process 302 and instructs it to execute the task. Server process 302 spawns a thread 322 to execute the task and starts a timer 320 to monitor the task duration. If the task completes in synchronous mode before timer 320 reaches a predetermined value, the results are reported as discussed above in relation to FIGS. 2A–2D. If communication channel 318 is inadvertently disrupted while the task is in synchronous mode, it will be reopened according to known methods.

Figure 3A:
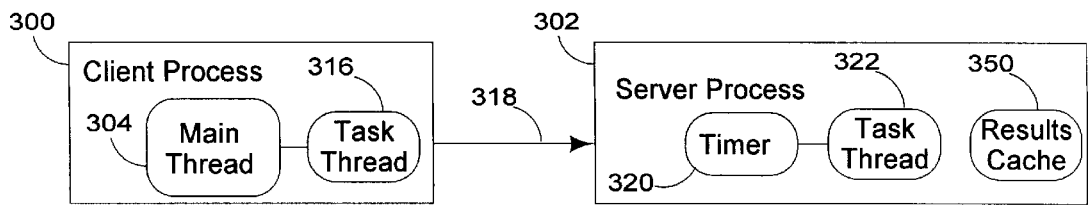
FIGS. 3A–3E are block diagrams illustrating resource usage during various steps of asynchronous task execution.
Figure 3B:
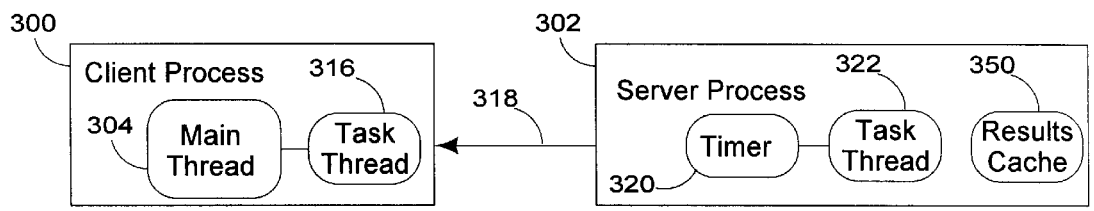

In the second step, shown in FIG. 3B, timer 320 reaches a predetermined value before task 322 finishes. Server process 302 contacts client process 300 across communication channel 318 which remained open from the first step shown in FIG. 3A and informs thread 316 that the task will continue in asynchronous mode. Server process 302 closes communication channel 318 and frees timer 320.

Figure 3C:
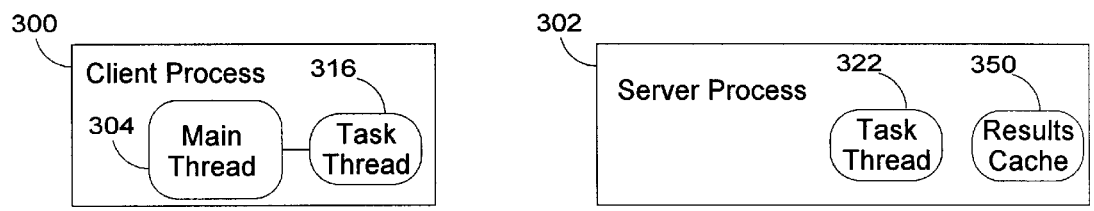

In the third step, shown in FIG. 3C, client process 300 waits for the task to complete, and thread 322 continues to execute the task.

In one embodiment, thread 316 in client process 300 is freed while the task continues to execute in server process 302, thus further freeing resources. This allows a greater number of remote server processes to be controlled simultaneously. If thread 316 is freed during asynchronous execution, it is restarted by the incoming communication manager 112 or by main thread 304 upon receiving data from server process 302 when the task has completed.

Figure 3D:
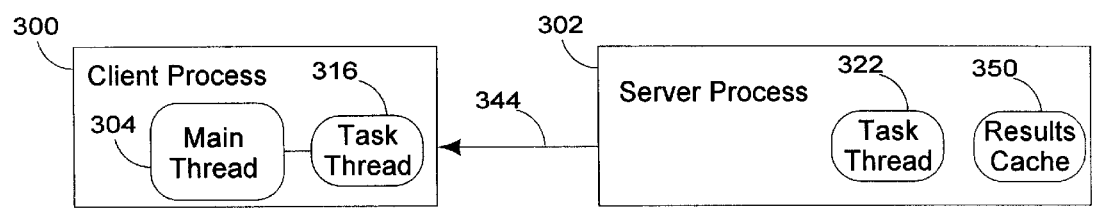

In step 4, shown in FIG. 3D, the task completes in thread 322, and a new communication channel 344 is opened between server process 302 and client process 300. Task status is reported by server process 302 to client process 300 as discussed above. Upon completion of the task, results are stored in memory cache 350. If the task results are greater than a predetermined size, server process 302 sends a message to client process 300 that the task is complete and that client process 300 can request the results when it is ready. If the task results are not greater than a predetermined size, server process 302 sends the task results to client process 300 immediately.

Figure 3E:
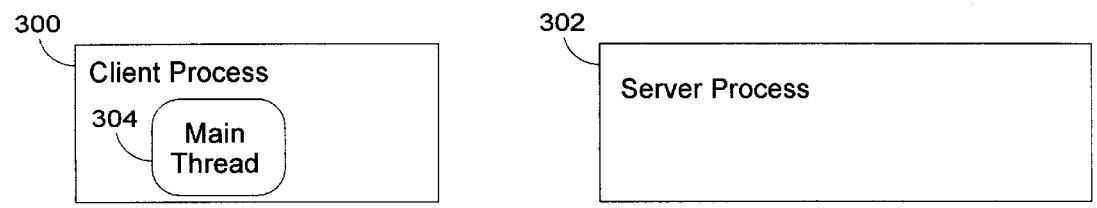

In step 5, shown in FIG. 3E, the task is finished and client process 300 and server process 302 have freed all system resources used in executing the task.

Figure 4:
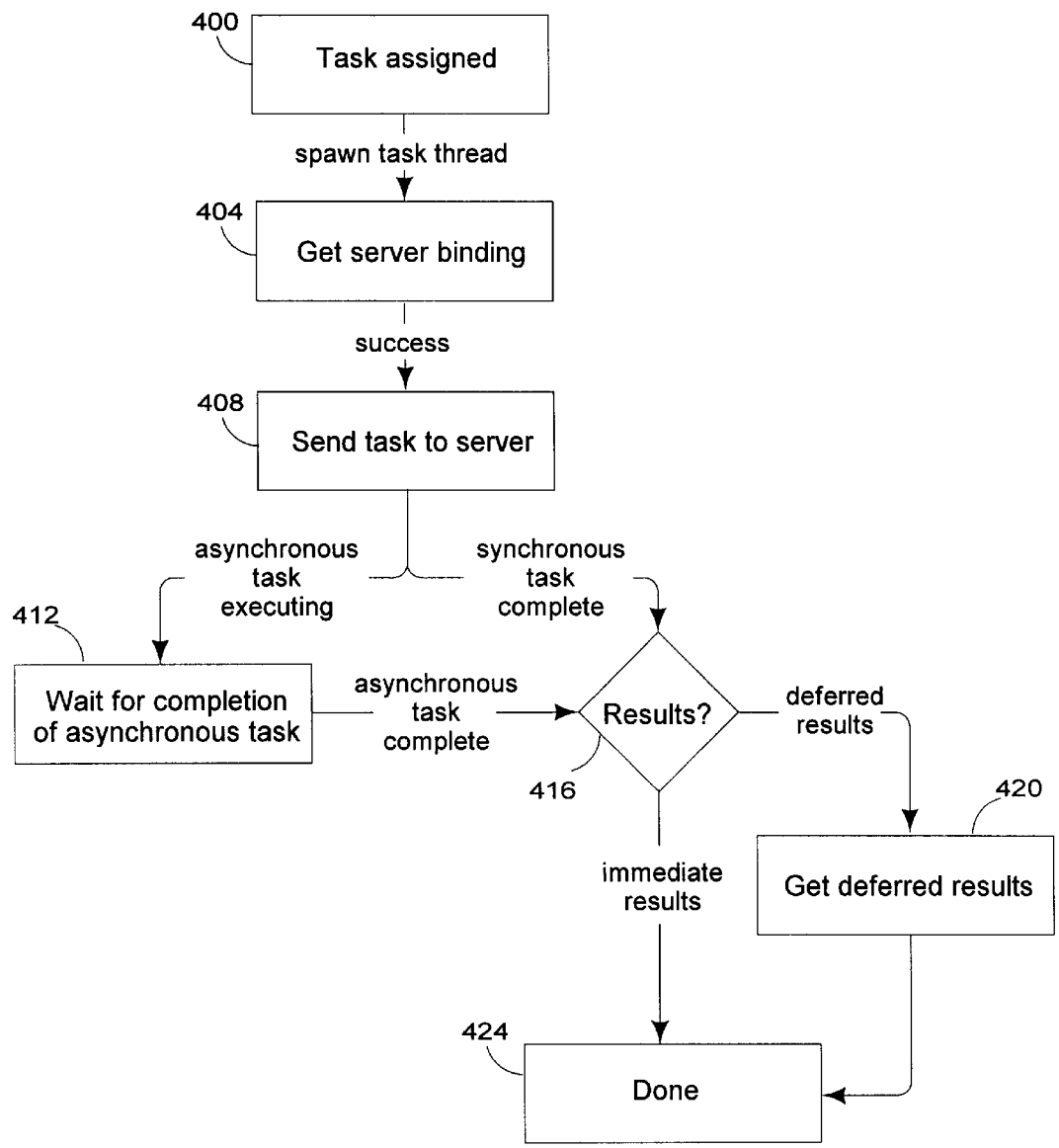
FIG. 4 is a flow chart outlining intelligent task execution in a client process.

FIG. 4 is a flow chart giving a more detailed illustration of the steps taken by the client process during intelligent task execution. To begin, a client process is assigned a task 400 in any manner previously known in the art. Client process then spawns a thread to initiate the remote task execution, and gets a server binding 404, opening a communication channel to a server process and registering the task with the incoming communication manager. When a server binding has successfully been acquired, the task is sent 408 to the server process. The client process then waits for the server process to respond either with the results of the task or with a notification that the task will be executed asynchronously. If the task will be executed asynchronously, the client process continues to wait 412 for the task to be completed. The thread used to initiate the remote task execution may be closed to free resources during the asynchronous task execution. If it is closed, it is then restarted when the asynchronous task completes and the server process reports that it is complete.

The results 416 are then either immediately received by the client process if the size of the results did not exceed a limit set by the administrator as determined by the server process, or a notice is received by the client process that the results are stored in the server process. If they were stored, the client process then gets the deferred results 420 and the task is complete 424.

Figure 5:
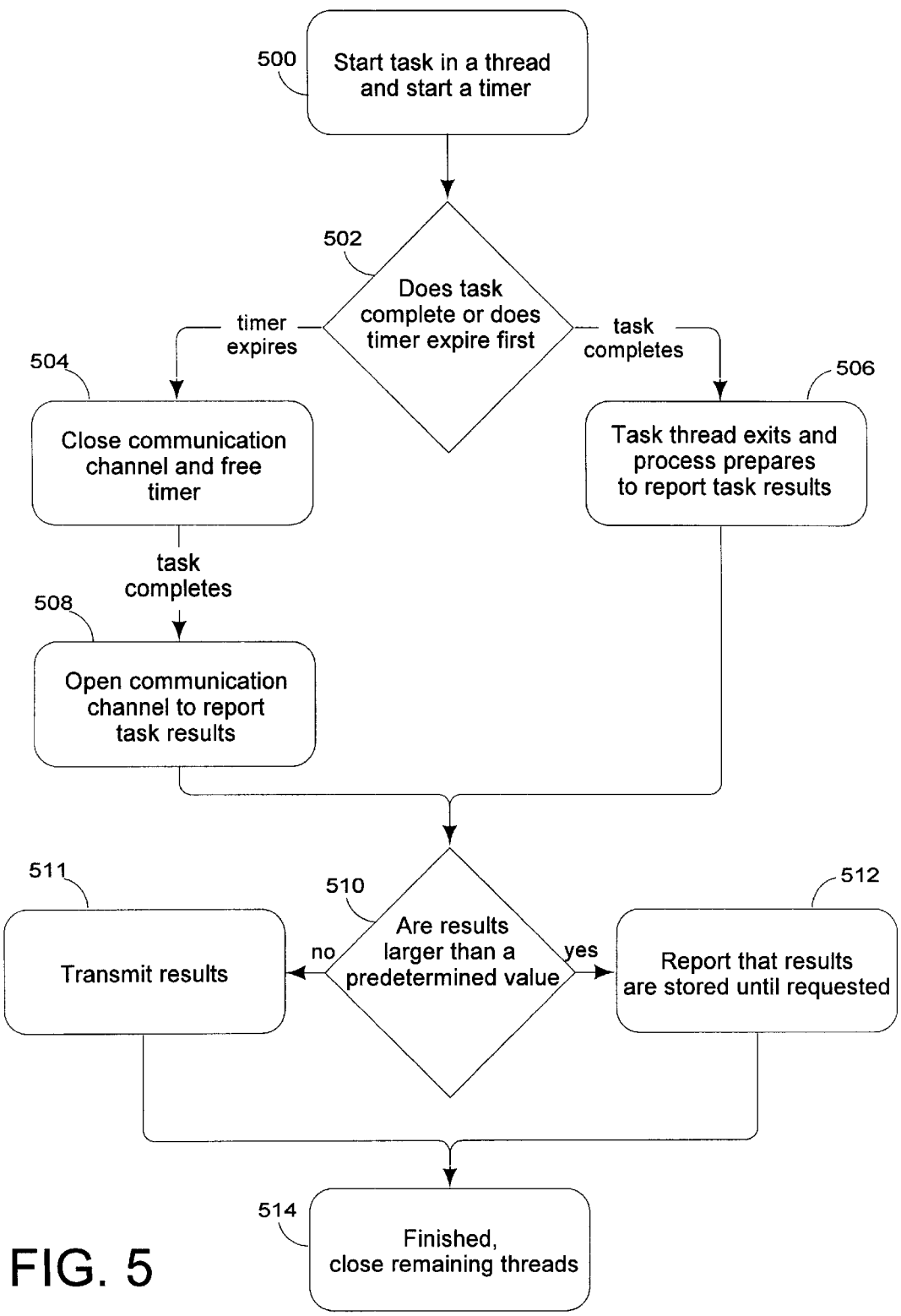
FIG. 5 is a flow chart outlining intelligent task execution in a server process.

FIG. 5 is a flow chart outlining task execution in a server process. When a server process has received task instructions from a client process, it starts the task 500 in a thread and starts a timer. The server process then waits 502 to determine if the task completes first or if the timer expires first. If the task completes before the timer reaches a preset value the task thread is closed 506 and the server process prepares to report the task results. If the timer expires before the task completes, the server process notifies the client process that the task will be completed asynchronously, closes the communication channel 504 and frees the timer. The server process then waits for the task to complete. When the task has completed, the server process reopens a communication channel 508 to the client process. The results of the task are stored in the server process until they are either transmitted immediately or requested later by the client process.

The server process then compares 510 the size of the results to a value predetermined by the administrator. If the results are not larger than the predetermined value, the results are transmitted immediately 511 to the client process. If the results are larger than the predetermined value, the server process reports 512 to the client process that they are available upon request. The task is then finished 514 and the server process closes the remaining thread used in executing the task.

The preferred embodiment of the invention described above saves system resources, allowing the client process to asynchronously execute many more simultaneous tasks than previously possible. As used in the claims, resources which are not essential to completion of a task may comprise any or all of the resources which are freed during asynchronous execution of a task, including, but not limited to communication channels, memory, threads and sockets. Local resources are those over which a server process has direct control (e.g., its own sockets and threads). Remote resources are those over which some other process has control (e.g., in some circumstances, a communication channel).

The preferred embodiment of the invention described above also enables a client process to control network communication traffic, intelligently managing network bandwidth and avoiding bottlenecks. A secondary benefit of robustness is achieved by storing the results in the server process, allowing them to be retrieved even if the client process is disrupted while the task is being asynchronously executed by the server process.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. In a computer implemented server process, a method of executing tasks in response to a request by a client process, comprising:
   a) starting a timer;
   b) beginning a task; and
   c) if the task does not complete before the timer reaches a predetermined value, initiating freeing of one or more resources which are not essential to completion of the task.

2. A method as in claim 1, wherein the timer is started and the task is begun while a first communication channel between the server process and a client process is open, the first communication channel being one which was initiated by the client process to request execution of the task, the method further comprising:
   a) if the task completes before the timer reaches the predetermined value, reporting task completion to the client process via the first communication channel; and
   b) if the task does not complete before the timer reaches the predetermined value, initiating opening of a second communication channel and reporting task completion to the client process via the second communication channel.

3. A method as in claim 1, further comprising:
   a) storing results of the task in a cache;
   b) determining whether the results exceed a predetermined size;
   c) if the results do not exceed the predetermined size, transmitting the results to the client process; and
   d) if the results exceed the predetermined size, transmitting a notification to the client process that the results are available.

4. A method as in claim 1, wherein at least some of the resources freed are local to the server process.

5. A method as in claim 1, wherein at least some of the resources freed are remote to the server process.

6. In a computer environment comprising a client process and a server process, a method of executing tasks, comprising:

a) the client process initiating opening of a first communication channel to the server process;

b) the client process instructing the server process, via the first communication channel, to execute a task;

c) the server process starting a timer and beginning the task; and d) if the task does not complete before the timer reaches a predetermined value, initiating freeing of one or more resources which are not essential to completion of the task.

7. A method as in claim 6, further comprising:

a) if the task is completed before the timer reaches a predetermined value, the server process reporting task completion to the client process via the first communication channel;

b) if the task is not completed before the timer reaches the predetermined value, the server process reporting task completion to the client process via a second communication channel established with the client process.

8. A method as in claim 6, further comprising:

a) if the task is not completed before the timer reaches the predetermined value, the server process notifying the client process, via the first communication channel, that the task will be executed asynchronously; and then b) initiating closure of the first communication channel.

9. In a computer implemented server process, a method of reporting task results to a client process, comprising:

a) storing task results in a cache;

b) determining whether the task results exceed a predetermined size;

c) if the task results do not exceed the predetermined size, transmitting the task results to a client process; and d) if the task results exceed the predetermined size, transmitting a notification to a client process that the task results are available.

10. A server process which executes tasks on behalf of one or more client processes, comprising:

a) one or more computer readable storage mediums; and b) computer readable program code stored in the one or more computer readable storage mediums, the computer readable program code comprising:

i) code for initiating execution of one or more tasks on behalf of one or more client processes;

ii) code for starting one or more timers corresponding to the one or more tasks; and iii) code for initiating freeing of one or more resources which are not essential to completion of a task if the task does not complete before its corresponding timer reaches a predetermined value.

11. A server process as in claim 10, wherein each of the one or more timers correspond to one of the one or more tasks.

12. A server process as in claim 10, wherein each of the one or more timers correspond to more than one of the one or more tasks.

13. A server process as in claim 10, wherein said predetermined value is set by a user.

14. A server process as in claim 10, wherein said predetermined value is fixed in program code.

15. A server process which executes tasks on behalf of one or more client processes, comprising:

a) one or more computer readable storage mediums; and b) computer readable program code stored in the one or more computer readable storage mediums, the computer readable program code comprising:

i) code for initiating execution of a task requested via a first communication channel;

ii) code for starting a timer corresponding to the task;

iii) code for initiating freeing of one or more resources which are not essential to completion of the task if the task does not complete before its corresponding timer reaches a predetermined value;

iv) code for reporting task completion via the first communication channel if the task is completed before the timer reaches a predetermined value; and v) code for initiating opening of a second communication channel and reporting task completion via the second communication channel if the task is not completed before the timer reaches the predetermined value.

16. A server process as in claim 15, further comprising code for:

a) transmitting a notification that the task will be executed asynchronously, via the first communication channel, if the task is not completed before the timer reaches the predetermined value; and then b) closing the first communication channel.

17. A server process which reports task results to a client process, comprising:

a) one or more computer readable storage mediums; and b) computer readable program code stored in the one or more computer readable storage mediums, the computer readable program code comprising:

a) code for storing task results in a cache;

b) code for determining whether the task results exceed a predetermined size;

c) code for transmitting the task results to a client process if the task results do not exceed the predetermined size; and d) code for transmitting a notification to a client process that the task results are available if the task results exceed the predetermined size.

18. A server process as in claim 17, wherein said predetermined size is set by a user.

19. A server process as in claim 17, wherein said predetermined size is fixed in program code.

* * * * *